United States Patent [19]

McCann et al.

[11] 4,324,283
[45] Apr. 13, 1982

[54] METHOD AND APPARATUS FOR MOUNTING A GIANT TIRE

[75] Inventors: Floyd E. McCann; Robert M. Fornell, both of Tulsa, Okla.

[73] Assignee: Unit Rig & Equipment Co.

[21] Appl. No.: 147,196

[22] Filed: May 6, 1980

[51] Int. Cl.³ .............................................. B60C 25/06
[52] U.S. Cl. .................................................. 157/1.28
[58] Field of Search .................... 157/1.1, 1.17, 1.2, 157/1.26, 1.28

[56] References Cited

U.S. PATENT DOCUMENTS

| | | | |
|---|---|---|---|
| 2,597,268 | 5/1952 | Simpson | 157/1.1 |
| 3,857,430 | 12/1974 | Harnois et al. | 157/1.2 |
| 3,972,363 | 8/1976 | West et al. | 157/1.26 |
| 4,109,698 | 8/1978 | West et al. | 157/1.2 |

Primary Examiner—James G. Smith
Attorney, Agent, or Firm—William S. Dorman

[57] ABSTRACT

A method for mounting a large tire onto a single-piece rim comprising the steps of first securing the rim to a stand having an upwardly extending ram, positioning an oblique cone atop the rim with the ram extending through its center, the majority of the cone is open except for three spaced and sloped segments wherein one segment is more steeply sloped than the two remaining segments, placing the tire on the cone, positioning a presshead having a downwardly extending post and three radially spaced hydraulic cylinder arms above the stand wherein the arms are pivotally mounted on the presshead and extend downwardly therefrom, a first arm having a horizontally disposed foot mounted on its lower end is aligned with the steeper segment, the two remaining arms each having a foot are aligned with the remaining segments respectively, lowering the presshead thereby receiving the ram within the post and having the feet resting upon the upper sidewall of the tire, extending the first foot against a first portion of the sidewall causing a portion of the bottom bead to slip into the drop center of the rim, extending the two remaining feet against the remaining portions of the sidewall, alternating the downward pressure against the remaining portions of the sidewall thereby rocking the bottom bead into the drop center, and then repeating the sequential process of applying downward pressure against the sidewall thereby causing the upper bead to be slipped into the drop center thus completing the mounting of the tire.

5 Claims, 18 Drawing Figures

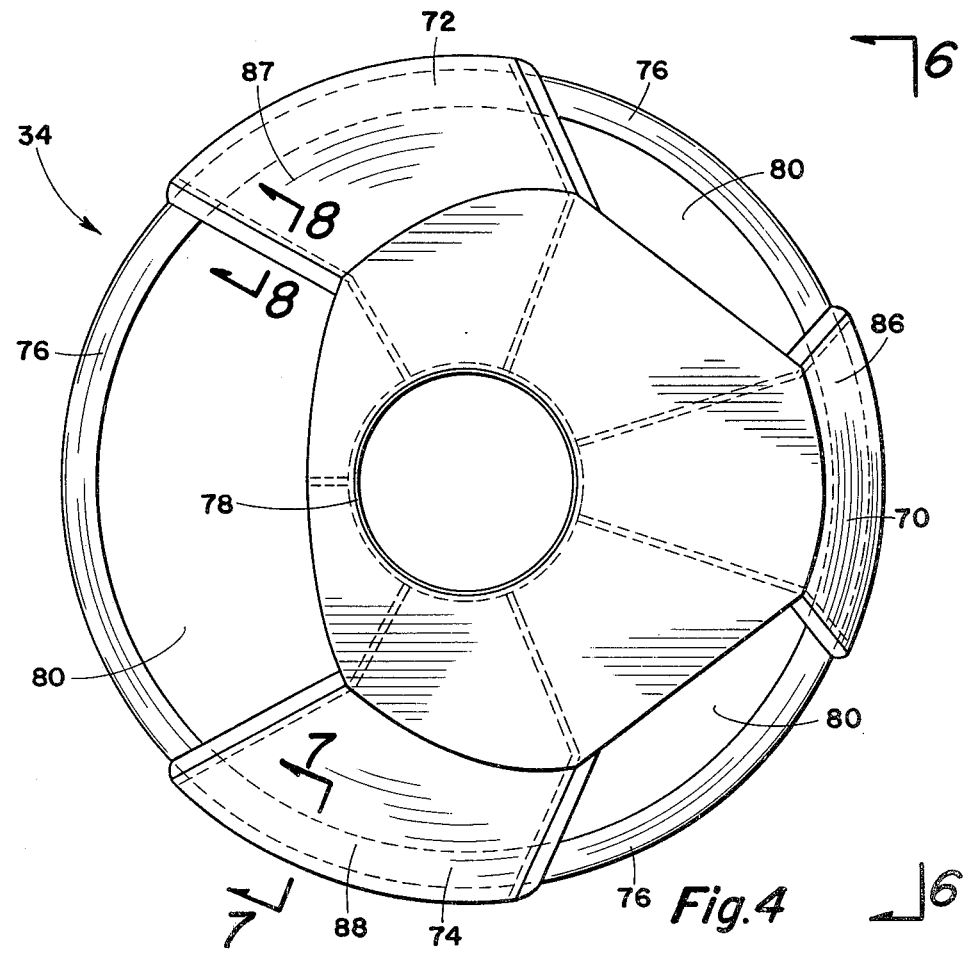
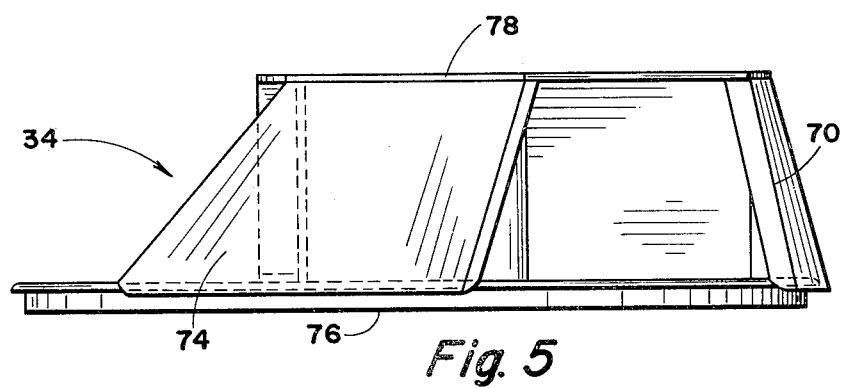

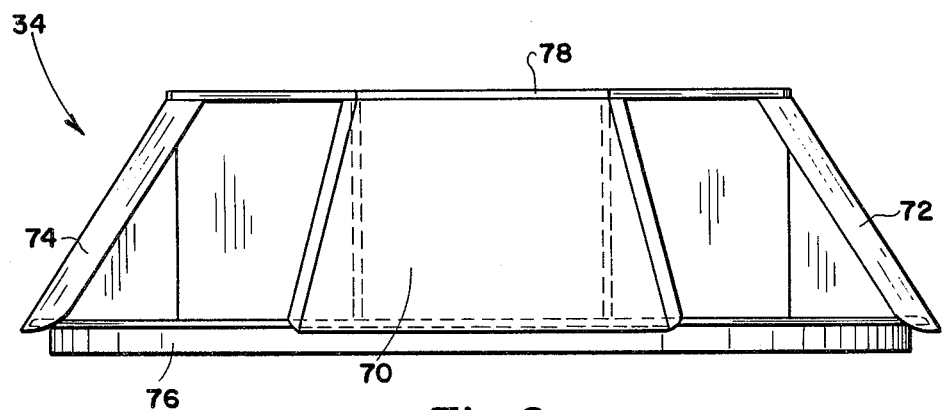
Fig. 6
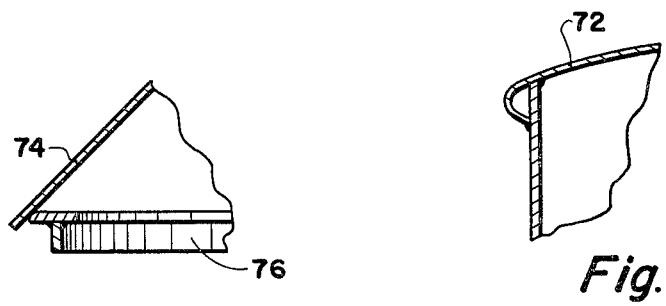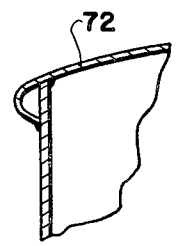
Fig. 7  Fig. 8
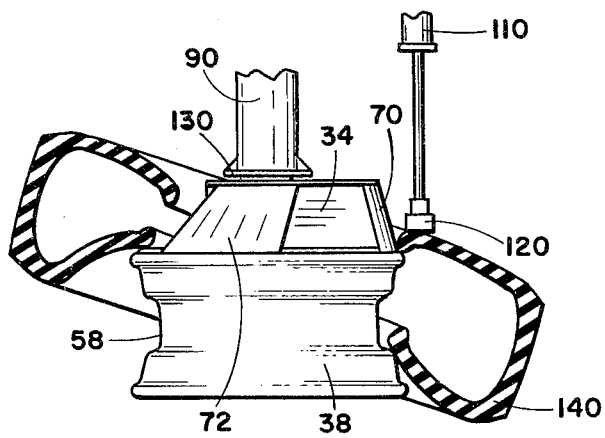
Fig. 17

METHOD AND APPARATUS FOR MOUNTING A GIANT TIRE

BACKGROUND OF THE INVENTION

1. Field of the Invention

The present invention relates to an improved method and apparatus for mounting and demounting a pneumatic tire from a single-piece dual-flanged rim, and more particularly to a method and apparatus employed for mounting giant tires commonly referred to as "off-highway tires" used on large earth moving and mining equipment.

2. Prior Art

The general practice in the industry heretofore has been to mount very large pneumatic tires onto five piece rims which have locking rings and gasket rings. The process of mounting off-highway tires onto these five piece rims is generally slow requiring several safety precautions to avoid serious injuries. The industry concluded that a single-piece rim, such as the kind used on automobiles and the like, would be more desirable; since the mounting of the tire onto the single-piece rim is generally safer. However, various problems occured when using crow bars and other prying tools to mount the giant tires onto these new single-piece rims. The beads of the giant tires are reinforced with heavy wire thereby requiring a substantial force to be applied in order to draw the beads out of round which oftentimes causes subsequent damage to the adjacent rubber and cord material.

A prior art patent, U.S. Pat. No. 3,489,998 to Malinski, discloses a method and apparatus for mounting and demounting giant tires onto the single-piece rims incorporating a hydraulic pusher and bead deflector guide arms to manipulate the tire onto the rim. Even with the use of the aforementioned patent or the other devices designed to mount off-highway tires onto single-pieced rims, problems involving damage to the bead and the rubber have still been encountered. No prior art device uses an oblique mounting cone in conjunction with a sequential mounting procedure designed to gently press the tires onto the rim thereby minimizing costly damage to the tire.

SUMMARY OF THE INVENTION

The present invention provides a method and an apparatus for mounting a giant tire onto a single-piece rim safely and in a minimum amount of time with no damage to the tire. The present invention also employs a grapple used to encage the heavy tire within its arms in order to move it easily onto a mounting stand and also to remove the mounted tire and rim after the mounting operation is completed. The grapple eliminates the need for an additional crane thereby lowering the cost of the entire machine.

More particularly, the present invention relates to an improved method and apparatus for the mounting and demounting of a pneumatic tire from a single-piece dual-flanged rim having a smaller diameter drop center. The tire changing machine of the present invention is intended for use with giant tires of the type to be mounted onto 15 degree rims. The basic tire changing machine comprises a stand having a base, a support platform and an upwardly extending central ram. The single-piece rim is placed on a portion of the support platform and is secured to the stand by a plurality of locking shoes which fit inside the lower flange of the rim. The support platform is also provided with a plurality of demounting shoes which are hinged so as to be lowered away from the rim during the mounting operation. The demounting shoes are affixed to the outer edge of a portion of the support platform adjacent the lower flange of the rim. The central ram is provided with a hydraulic cylinder which is employed to raise or lower the ram.

An off-center or oblique mounting cone is placed on top of the rim so that the ram extends upwardly through their aligned centers. The majority of the cone is cutaway, or open, leaving three partial side segments which are sloped. One of the side segments has a steeper slope with respect to the horizontal than the remaining two side segments which have substantially equal inclinations. The two remaining side segments are each spaced circumferentially approximately 105 degrees off the center of the steeper sloped side segment.

After a tire has been placed on the cone, a presshead is positioned above the tire changing machine. The presshead comprises a downwardly extending central post, three radially extending beams, and three hydraulic cylinder arms. The arms are pivotally mounted at their upper ends on the outer ends of the beams and extend downwardly therefrom. One of the arms, herein designated as the rear arm, will be aligned with the steeper sloped side segment of the cone, which has also been positioned at the rear of the apparatus. However, the cylinder arms have only limited pivotal (universal) movement as will hereinafter appear. A horizontally disposed foot is pivotally mounted at its center on the lower end of each cylinder arm. A hydraulic jack is mounted on the base of the stand so as to be disposed directly beneath the rear portion of the lower sidewall of a pneumatic tire. The jack is employed to push the tire off the rim during the demounting operation.

The following summarizes the mounting operation of the present invention:

A single-piece dual-flanged rim having a 15 degree drop center is positioned on the support platform of the stand. The rim is secured to the stand by locking shoes which slide inside the lower flange of the rim. The oblique mounting cone is hoisted onto the stand and is positioned on top of the rim with the ram extending through its center. The steeper sloped side segment is positioned at the rear of the apparatus and a lubricant is applied to the side segments of the cone and to the upper flange of the rim.

The grapple, having four radially spaced grapple arms, is lowered onto a large tire and the arms are locked so as to encage the tire within the grapple arms. The tire is lowered onto the cone so that its lower sidewall is closely adjacent the upper flange of the rim. The grapple is then disconnected and put off to one side, and the lubricant is also applied to the beads of the tire.

The presshead is now positioned above the apparatus so that the feet of the cylinder arms are aligned with their respective side segments. The presshead is lowered so that the ram is received in the post and the feet just come to rest on the upper sidewall of the tire. The ram and post are initially locked by means of four roll pins inserted into the same and then the hydraulic cylinder slightly lowers the ram thereby forming a secured and continuous machine.

The feet of the cylinder arms are then checked to assure that they are flat against the upper sidewall and the rear arm is checked to assure that its initial position is true vertical which is its inwardmost or forwardmost position. The remaining two arms should slant slightly forward inward approximately 1 to 2 degrees from the true vertical. The rear arm is limited to rear or backward movement and the two remaining arms are limited to inward movement with respect to the center of the cone. A downward pressure is applied to a first portion of the upper sidewall by extending the rear foot. The pressure stretches the tire (and bead) down and over the upper flange causing a portion of the bottom bead to slip into the drop center. While maintaining constant pressure against this first rear portion, downward pressure is applied to the other two portions of the upper sidewall by extending the two remaining feet until a maximum stretch of the tire (and bead) is achieved. The remaining portion of the bottom bead is slipped into the drop center by alternating the downward pressure supplied by the two remaining feet thereby rocking the tire gently over the upper flange.

The sequential procedure of the above paragraph is repeated to slip the upper bead into the drop center thus completing the mounting operation. Once the tire has been inflated, the rim is unlocked from the stand and the mounted tire is removed from the stand by means of the grapple.

The following summarizes the demounting operation of the present invention:

The demounting shoes are raised and secured in position so that they are perpendicular to the support platform. A mounted (deflated) tire is encaged within the grapple arms and is then lowered onto the stand. As the tire is lowered, the lower portion of the tire presses down against the upwardly extending demounting shoes. The shoes provide an upward thrust against the descending tire and directly on the bottom bead which serves to break the bead away from its respective flange.

When the tire is completely lowered onto the stand, the locking shoes are slid into the bottom flange of the rim thus securing it to the stand. A lubricant is then applied to the beads. The hydraulic jack beneath the tire is raised so that it supplies a steady upward pressure to the rear portion of the lower sidewall. The jack slowly lifts the tire off the rim and then a hook is secured to the center of the tire so that it can be removed from the machine. Once the demounting shoes are lowered, a new tire can be mounted onto the rim.

BRIEF DESCRIPTION OF THE DRAWINGS

FIG. 4 is a top plan view of the mounting cone;

FIG. 5 is a side elevational view of the mounting cone;

FIG. 6 is a rear elevational view of the mounting cone taken along section line 6—6 of FIG. 4;

FIG. 7 is a cross-sectional view taken along section line 7—7 of FIG. 4;

FIG. 8 is a cross-sectional view taken along section line 8—8 of FIG. 4;

FIG. 17 is a sectional view of FIG. 15; and

DESCRIPTION OF THE PREFERRED EMBODIMENTS

The present invention relates to an improved method and apparatus for mounting and demounting a large pneumatic tire onto a single-piece rim similar to the type used on automobiles and the like. Large or giant tires are commonly referred to as "off-highway tires" and are generally used on earth moving and mining equipment.

Currently, the general practice in the industry is to mount these large tires onto five piece rims which require locking rings and gasket rings. The present invention completely eliminates the use of the five piece rims which can be quite dangerous if exacting safety precautions regarding mounting and demounting are not followed. The present invention provides a method and an apparatus to mount a large tire onto a single-piece rim which is considered to be generally safer and yet avoid excessive manipulation of the beads which tends to damage the tire.

Figure 1:
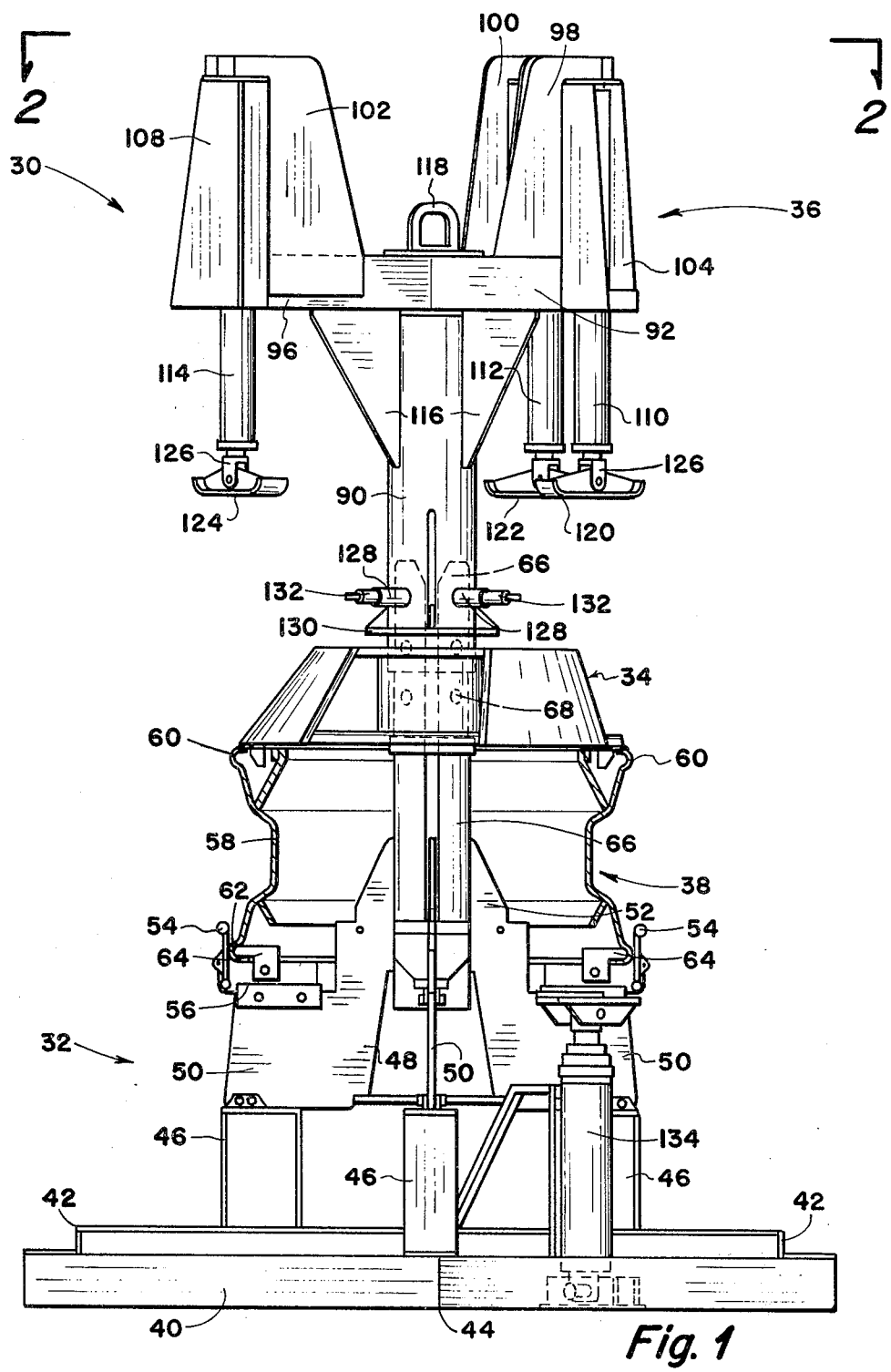
FIG. 1 is a side elevational view of the tire mounting apparatus of the present invention.

Referring to the drawings in detail, the tire mounting apparatus 30 of the present invention is shown in FIG. 1. Apparatus 30 includes a stand 32, an off-center or oblique mounting cone 34, and a presshead or mounter 36, the greater details of which will be described hereinafter. Also shown is a single-piece dual-flanged rim 38 atop which is resting mounting cone 34.

Figure 2:
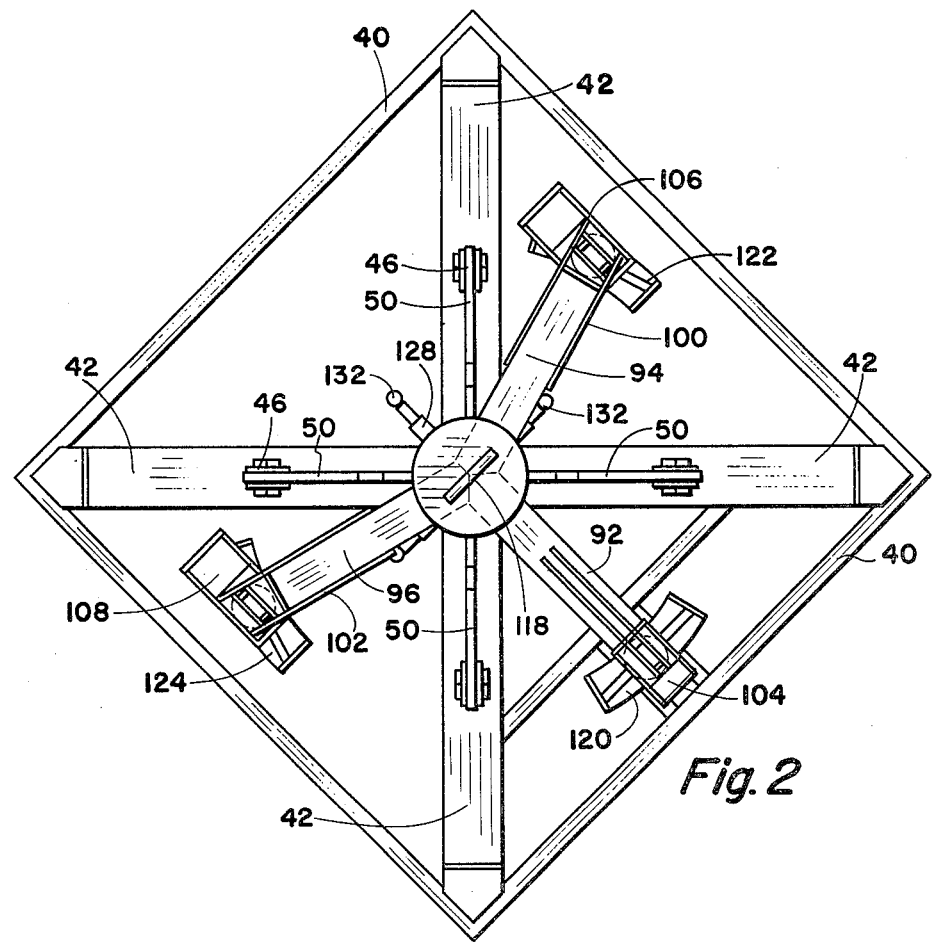
FIG. 2 is a top plan view of the above taken along section line 2—2 of FIG. 1.
Figure 3:
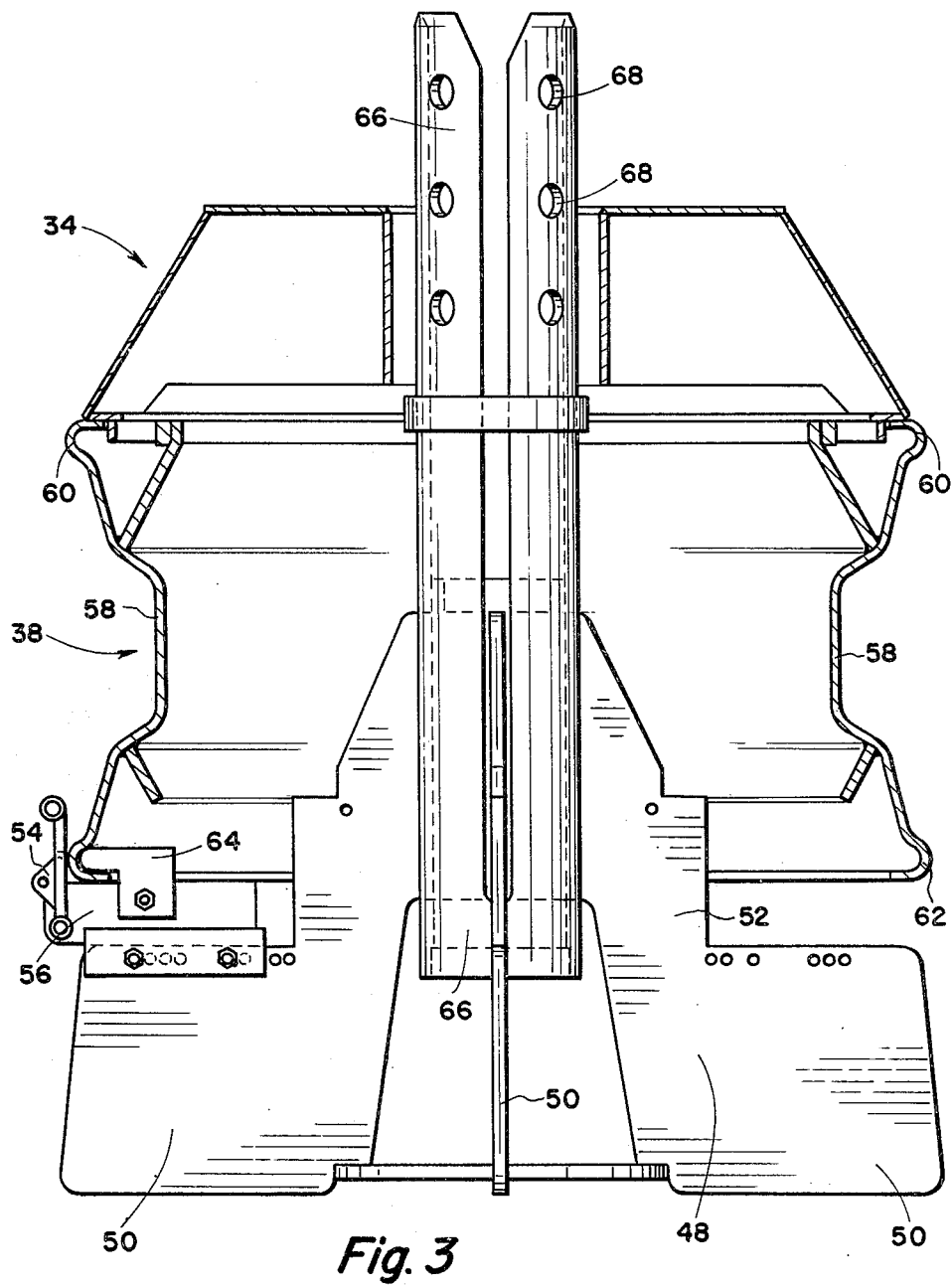
FIG. 3 is a front elevational view of a base, a single-piece rim, and a mounting cone in accordance with the present invention.

Referring in detail to FIGS. 1, 2, and 3, stand 32 is comprised of a horizontally disposed substantially square base 40 resting on a flat surface such as the ground, and a pair of crossbeams 42 which intersect at right angles at a center point 44 of the square which is formed by base 40 (see FIG. 2). Four vertical legs 46, three of which are shown in FIG. 1, are affixed to crossbeams 42 in the central area of the base and extend upwardly therefrom. A support platform 48 is comprised of four radially extending circumferentially spaced vertical plates 50 whose lower portions extend out as wings and whose upper portions are joined together to form a central pillar 52. The upper ends of legs 46 are bolted to the lower ends of plates 50. Support platform 48 is provided with a plurality of hinged demounting shoes 54 affixed to the outer ends of a plurality of horizontally adjustable hinge blocks 56, two of which are shown in FIG. 1. As shown, demounting shoes 54 are perpendicular to the support platform and the hinge blocks, and whose purpose will be disclosed hereinafter.

As best shown in FIG. 3, a single-piece rim 38 rests on hinge blocks 56 of the support platform. For example, rim 38 is a 15 degree rim having a smaller diameter drop center 58, and upper flange 60 and a lower flange 62. The support platform is also provided with a plurality of locking shoes 64 (one of which is shown) which fit inside lower flange 62, as shown. Locking shoes 64 can be either hinged or slidable and provide the means to secure the rim to stand 32. A central ram 66 connects with vertical plates 50 and extends upwardly from pillar 52 through the aligned centers of the rim and mounting cone 34. Ram 66 is provided with an integral hydraulic cylinder (not shown) and a plurality of circumferentially spaced holes 68, whose purpose will be disclosed hereinafter.

Figure 13:
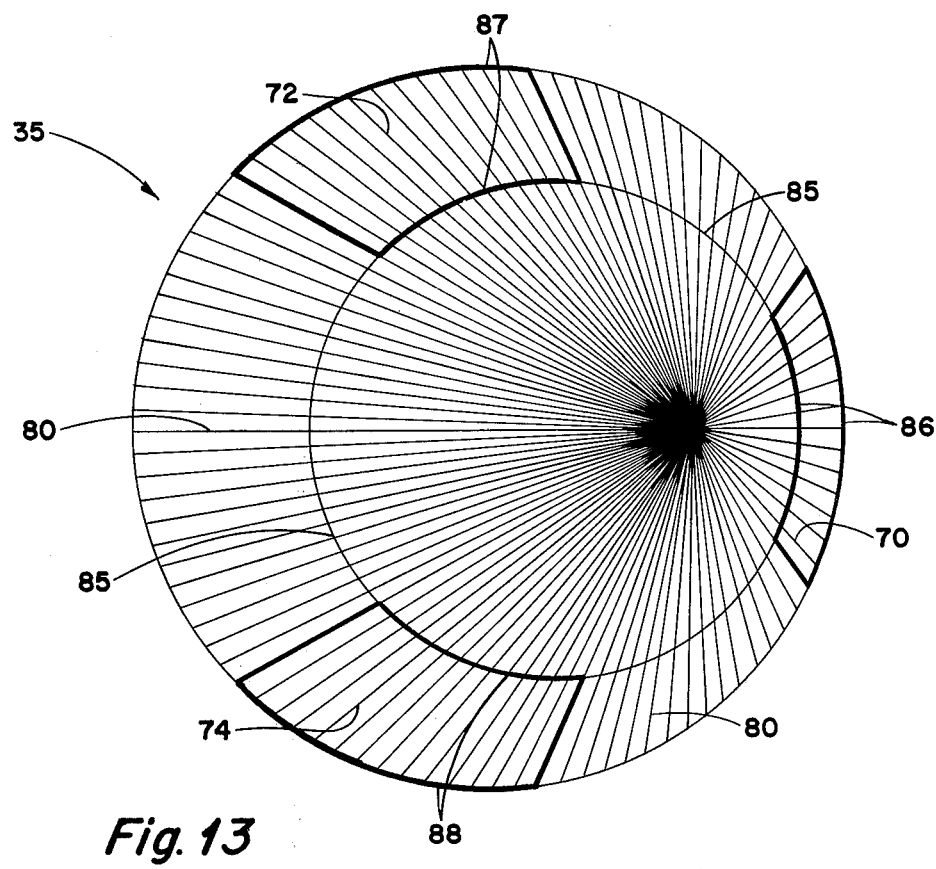
FIG. 13 is a diagrammatic representation of the generation of an oblique cone from which the partial conic surfaces (also shown diagrammatically) originate, this figure showing a top plan view.
Figure 14:
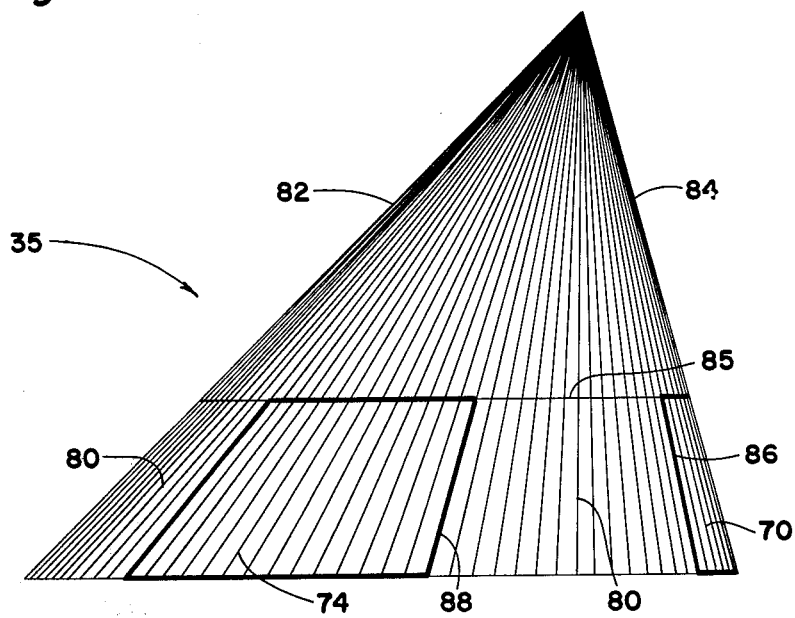
FIG. 14 is a side elevational view taken from FIG. 13.

The greater details of oblique mounting cone 34 are shown in FIGS. 4, 5, 6, 7, and 8. The majority of the cone is cut-away or open, leaving three partial side segments 70, 72 and 74, whose lower ends are affixed to an open circular base 76 and whose upper ends are affixed to an open circular center or top 78 which has a smaller diameter than base 76. The general configuration of mounting cone 34 can be obtained by generating an oblique cone 35 (see FIGS. 13 and 14) having a 45 degree side 82 (from the vertical) along the longest radius line from its oblique center and a 15 degree side 84 (from the vertical) along the shortest radius line wherein the generated oblique cone is subsequently cut-off or truncated along line 85. The oblique cone 35 of FIGS. 13 and 14 can be generated, for example, by creating a cone whose height is approximately 80 percent of the diameter of its base and whose apex is offset approximately 30 percent of the diameter from the center of the base. As shown in FIGS. 13 and 14, the generated oblique cone is divided into three segments 86, 87 and 88 below the line 85. Each segment subtends an arc of approximately 52⅓ degrees along the lower circle and also approximately 52⅓ degrees along the upper circle at the truncating line 85 between two lines of generation. The segment 86, if developed in plane, would be an isosceles trapezoid; the segments 87 and 88, if developed in plane, would be trapezoids having unequal vertical sides, the shorter sides being disposed toward the segment 86. In FIGS. 13 and 14, the open spaces between segments 87 and 88 and segment 86 are each slightly in excess of 56 degrees. The open space to the right between segment 87 and segment 88 is approximately 90 degrees. As shown, side segments 70, 72 and 74 are sloped in such a manner that if the open areas 80 were enclosed to match the curvature of the partial side segments, mounting cone 34 would closely resemble the above mentioned truncated cone 35, in that elements 86, 87 and 88 of cone 35 correspond to the surfaces of side segments 70, 72 and 74 of the actual cone 34. Side segment 70 has a steeper slop (75 degrees) with respect to the horizontal than the remaining two side segments 72 and 74 and therefore its center correspond to the 15 degree (with respect to the vertical) side 84 of the oblique cone. Side segments 72 and 74 have substantially equal inclinations and are each spaced circumferentially approximately 105 degrees off the center of side segment 70.

Figure 9:
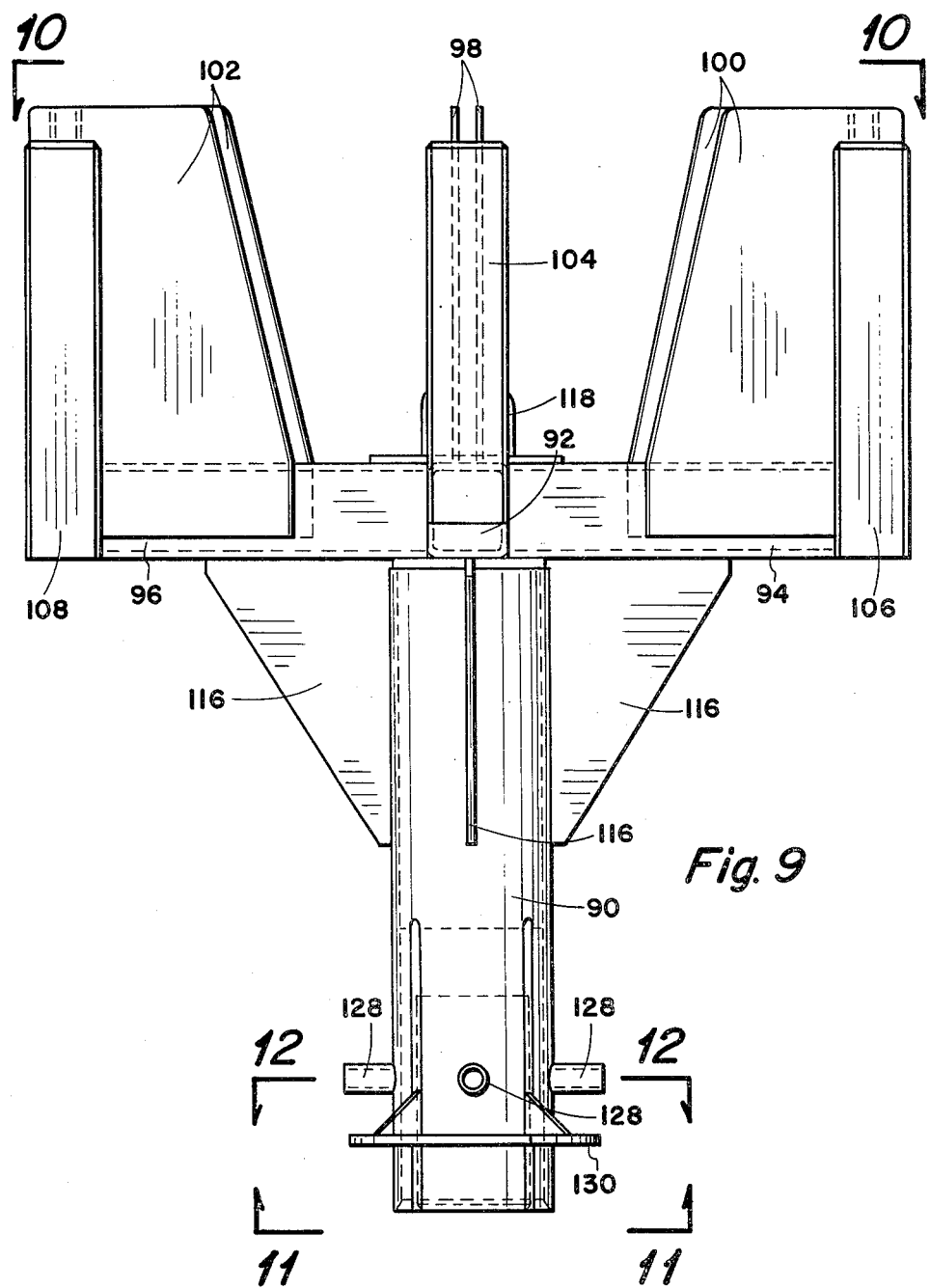
FIG. 9 is a front elevational view of a presshead utilized in the present invention.
Figure 10:
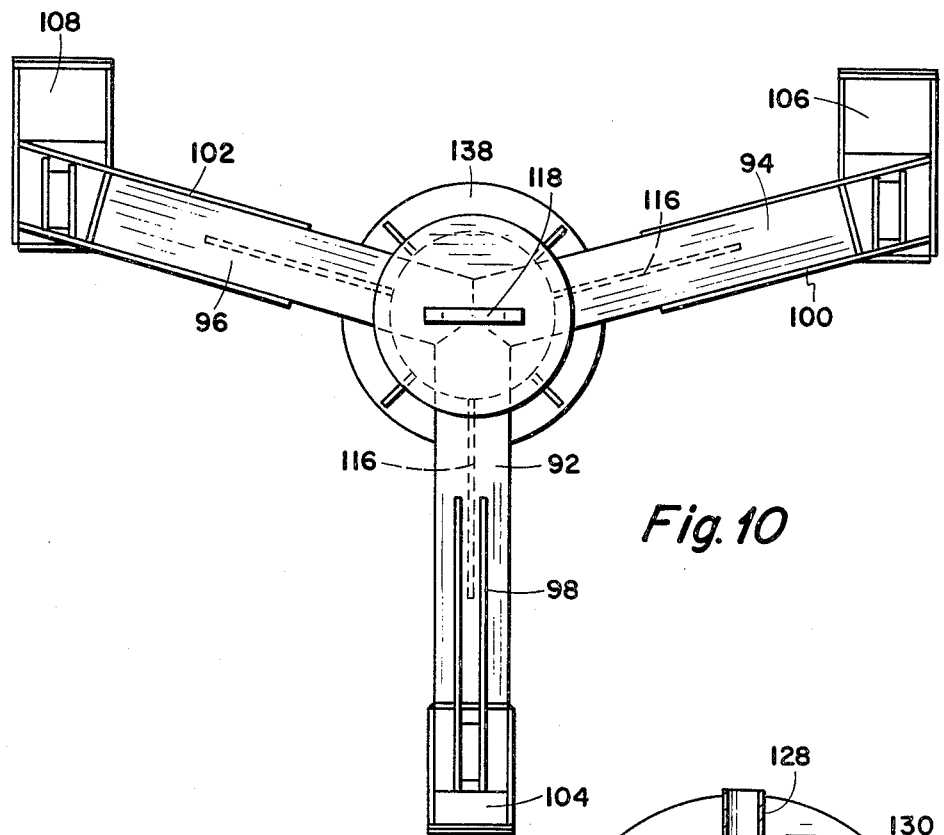
FIG. 10 is a top plan view of the presshead taken along section line 10—10 of FIG. 9.
Figure 12:
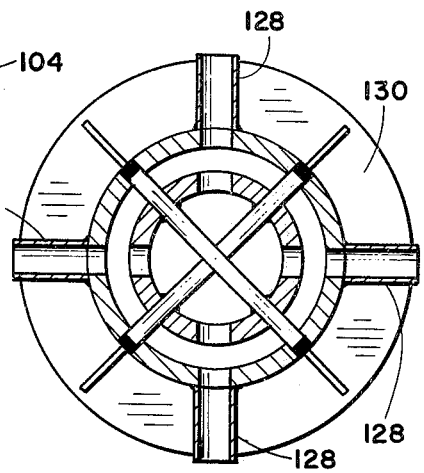
FIG. 12 is a cross-sectional view taken along section line 12—12 of FIG. 9.
Figure 11:
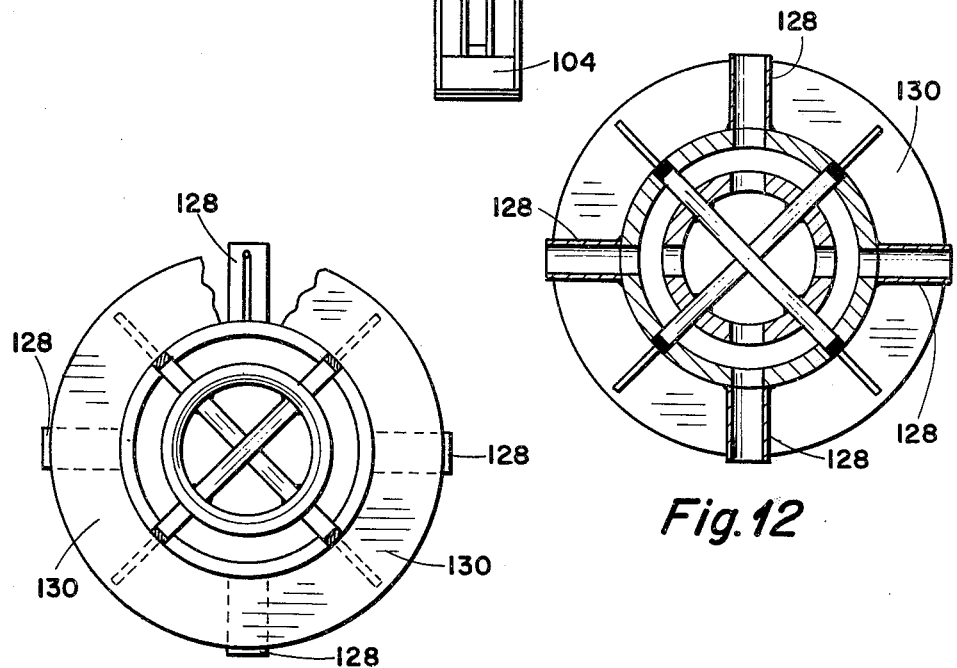
FIG. 11 is a cross-sectional view taken along section line 11—11 of FIG. 9.

Referring to FIGS. 9 and 10, a portion of presshead 36 is shown comprising a downwardly extending central vertical post 90 and three radially extending beams 92, 94 and 96. Each beam 92, 94 and 96 is provided with a pair of parallel vertical plates forming housings 98, 100 and 102, respectively. Housings 98, 100 and 102 are each provided with a U-shaped retainer or sleeve 104, 106 and 108, respectively, affixed to their outer ends.

As shown in FIG. 1, retainers 104, 106 and 108 are provided with vertically disposed open outer ends. Three cylinder arms 110, 112 and 114 are received within sleeves 104, 106 and 108, respectively, and are pivotally mounted at their upper ends on their respective sleeves. Cylinder arms 110, 112 and 114 are hydraulically powered and extend past the lower ends of sleeves 104, 106 and 108 approximately ½ their length. Presshead 36 is also provided with three triangular plates or gussets 116 affixed to vertical post 90 and to the lower sides of the beams. Gussets 116 provide a support for beams 92, 94 and 96 and for the attached cylinder arms. The presshead is provided with a hoist eye 118 affixed to the top surface of the beams at the central area where the same are joined.

Cylinder arm 110, also referred to as rear arm 110, will be aligned with the (rear) side segment 70 so as to be positioned at the rear of the apparatus during the mounting operation which will be described hereinafter. Therefore, the two remaining cylinder arms 112 and 114 will be aligned with the remaining side segments 72 and 74, respectively. As shown in FIGS. 2 and 10, the cylinder arms 112 and 114 are each spaced circumferentially approximately 105 degrees off the rear arm 110. The cylinder arms have limited universal (pivotal) movement, in that; rear cylinder arm 110 is limited to rear or backward movement and the two remaining arms 112 and 114 are limited to forward inward movement with respect to the center of the mounting cone.

Returning to a further consideration of FIG. 1, each of the cylinder arms 110, 112, and 114, is provided with a horizontally disposed foot, 120, 122 and 124, respectively. The foot is pivotally mounted at its center on a clevis 126 which is affixed to the lower end of each respective cylinder arm. Each foot is provided with a non-skid surface on its bottom (not shown).

Vertical post 90 of the presshead is provided with four radially spaced cylinders or barrels 128 and a circular limit plate 130. As shown in FIG. 1, ram 66 is received inside vertical post 90 and both are positioned so that holes 68 are aligned with barrels 128. Limit plate 130 limits the downward position of the presshead as the limit plate comes to rest against top 78 of the mounting cone. The ram can be raised or lowered by means of the hydraulic cylinder. Once the holes are aligned with the barrels, four roll pins 132 are inserted through the barrels into the holes, and the hydraulic cylinder slightly lowers the ram thus securing the stand and the presshead together thereby forming a continuous machine.

Returning to FIG. 1, base 40 is also provided with a hydraulic jack or push-off cylinder 134 which will be employed to demount a pneumatic tire from rim 38.

The following summarizes the mounting operation of the present invention:

As shown in FIGS. 1 and 3, single-piece rim 38 is positioned on support platform 48 of the stand and is secured by locking shoes 64 which are inserted into its lower flange 62. Demounting shoes 54 are then lowered away from their perpendicular positions as shown in the drawings. Oblique mounting cone 34 is hoisted above stand 32 and is then lowered into position on top of the rim so that ram 66 extends through their aligned centers. A lubricant is applied to the side segments of the cone and to the upper flange 60 of the rim.

A grapple (not shown), having four radially spaced grapple arms, is lowered onto a large pneumatic tire 140 (see FIG. 15) and the arms are locked in order to encage the tire within them. The tire is raised above the stand and is then lowered onto the mounting stand so that its lower sidewall is closely adjacent the upper flange of the rim. The grapple is disconnected and put off to one side, and the lubricant is applied to the beads of the tire.

Presshead 30 is then positioned above the apparatus so that feet 120, 122 and 124 of cylinder arms 110, 112 and 114, respectively, are aligned with their respective side segments 70, 72 and 74 of the mounting cone. The presshead is lowered so that ram 66 is received in post 90 (see FIG. 1) and the feet just come to rest on the upper sidewall of the tire. As previously described, the ram and the post are initially locked together by means of four roll pins 132 inserted into barrels 128 of the post and into holes 68 of the ram. The hydraulic cylinder of the ram slightly lowers it and the attached post thereby forming a continuous and secured machine.

Figure 15:
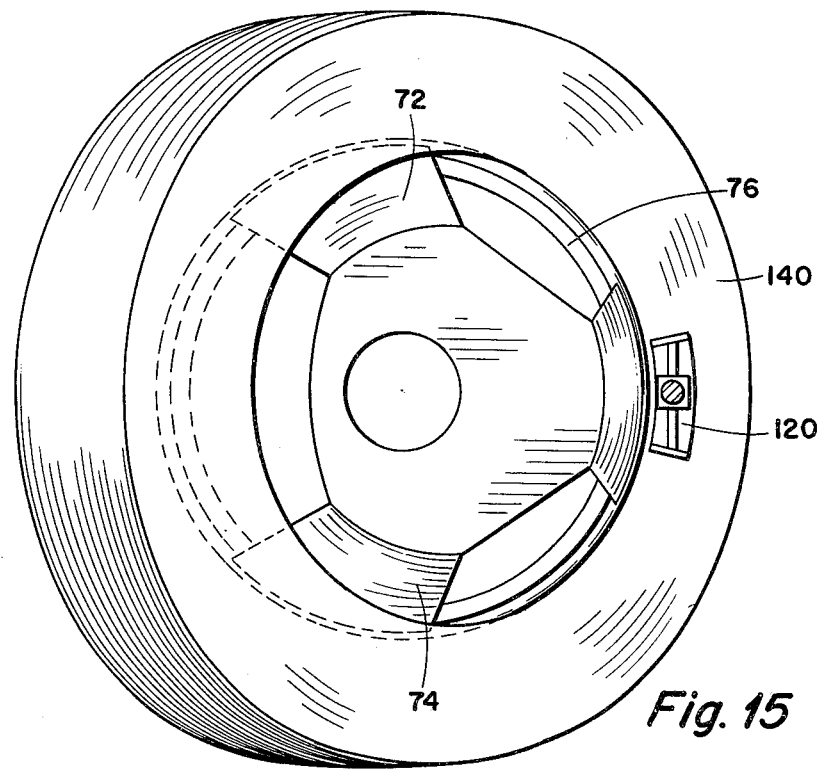
FIG. 15 is a diagrammatic representation of the first step of pushing a tire onto a single-piece rim as per the sequential operating procedure of the present invention, this figure showing a top plan view.
Figure 16:
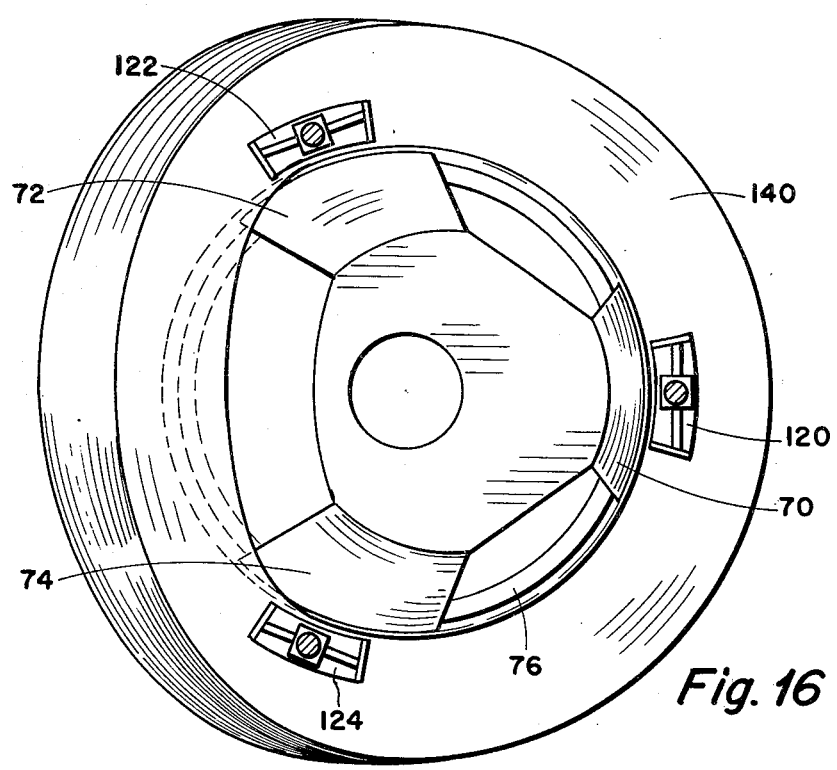
FIG. 16 is the second step of FIG. 15.

The feet of the cylinder arms are checked to assure that their bottoms are flat against the upper sidewall and that rear arm 110 is in an initial position of true vertical. The remaining two arms 112 and 114 should slant slightly inwardly toward the center of the mounting cone approximately 1 to 2 degrees from true vertical. As shown in FIG. 15, a downward pressure by rear foot 120 is applied to a first portion of the upper sidewall of tire 140. The pressure slides the tire down side segment 70 and stretches the tire and the bead down and over the upper flange of the rim causing a portion of the bottom bead to slip into drop center 58 (see FIG. 17). While maintaining constant pressure against the first portion of the sidewall, downward pressure is applied to the remaining portion of the upper sidewall by the two remaining feet 122 and 124 (see FIG. 16) until a maximum stretch of the tire and bead is achieved. The remaining portion of the bottom bead is slipped into the drop center by alternating the downward pressure supplied by feet 122 and 124 thereby rocking the tire gently onto the rim.

The sequential procedure of the above paragraph is repeated to slip the upper bead of tire 140 into the drop center of rim 38 thus completing the mounting operation. Once the tire has been inflated, rim 38 is unlocked from the stand and the mounted tire is removed by means of the grapple.

The following summarizes the demounting operation of the present invention:

Demounting shoes 54 are raised to the perpendicular position shown in FIG. 1. A mounted deflated tire is then encaged within the grapple arms and is lowered onto stand 32. As the tire is lowered, the bottom bead presses down against the upwardly extending demounting shoes. Demounting shoes 54 provide an upward thrust directly against the bottom bead which subsequently breaks the bead away from its respective flange. A lubricant can be applied to the beads after they have been broken.

Figure 18:
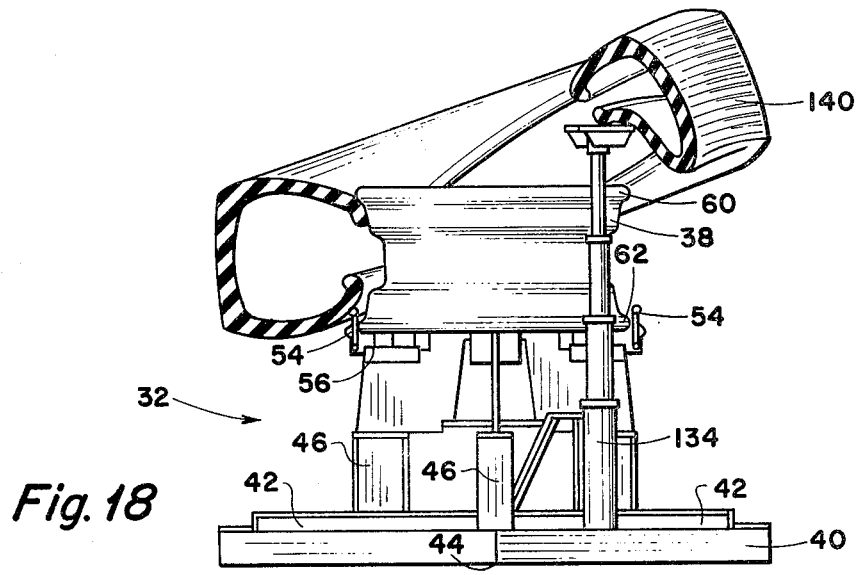
FIG. 18 is a side elevational view of the demounting operation.

Referring to FIG. 18, when tire 140 is completely lowered onto stand 32 locking shoes 64 are slid inside bottom flange 62 to secure rim 38 to the stand. Hydraulic jack 134 which is beneath the tire, is raised so that it supplies a steady upward pressure to the rear portion of the lower sidewall. As shown, jack 134 slowly lifts the tire off the rim an then a hook (not shown) is secured to the center of the tire so that it can be removed from the machine. Once the demounting shoes have been lowered, a new tire can be mounted onto the rim.

Whereas the present invention has been described in particular relation to the drawings attached hereto, it should be understood that other and further modifications, apart from those shown or suggested herein, may be made within the spirit and scope of this invention.

What is claimed is:

1. An improved tire changing apparatus comprising a stand having an upwardly extending ram, means for locking the lower flange of a single-piece dual-flanged rim onto said stand, an oblique mounting cone having the majority of its side surfaces cut away except for three sloped side segments wherein one sloped side segment is of a steeper inclination with respect to the horizontal than the two remaining side segments, said two remaining side segments of lesser inclination being spaced from said one steeply sloped side segment in opposite circumferential directions somewhat less than one third of the circumference of said cone, said cone being positioned atop said rim and having said ram extending through its center, a presshead having a downwardly extending central post and three cylinder arms, said presshead being positioned above said cone and having said ram received within said post, means for locking said ram and said post together, said cylinder arms having upper ends pivotally mounted on the outer ends of a portion of said presshead and extending downwardly therefrom, a horizontally disposed foot being pivotally mounted at its center on the lower end of each cylinder arms wherein each foot is aligned with a respective sloped side segment and being adapted to rest on the upper sidewall of a pneumatic tire to be mounted on said rim.

2. An improved tire changing apparatus as set forth in claim 1 wherein said means for locking said post and said ram together comprises a plurality of roll pins inserted into radially spaced and vertically aligned holes in said ram and said post.

3. An improved tire changing apparatus as set forth in claim 1 wherein said means for locking said lower flange of said rim to stand comprises a plurality of locking shoes mounted on an outer portion of said stand and adapted to be slid inside said lower flange.

4. An improved tire changing apparatus as set forth in claim 1 and including means for demounting said tire comprising a plurality of hinged shoes affixed to a portion of said stand adjacent lower said flange of said rim, and a hydraulic jack mounted on said stand so as to be disposed beneath a portion of said tire.

5. An improved tire change apparatus as set forth in claim 1 wherein said one steeply sloped side segment of said cone is positioned at the rear of said apparatus and said two remaining side segments are each spaced circumferentially approximately 105 degrees from the center of said rear side segment.

* * * * *